Aug. 15, 1967 R. E. MEDD 3,335,553
FORAGE AND COMBINE HARVESTER
Original Filed March 10, 1964 3 Sheets-Sheet 2
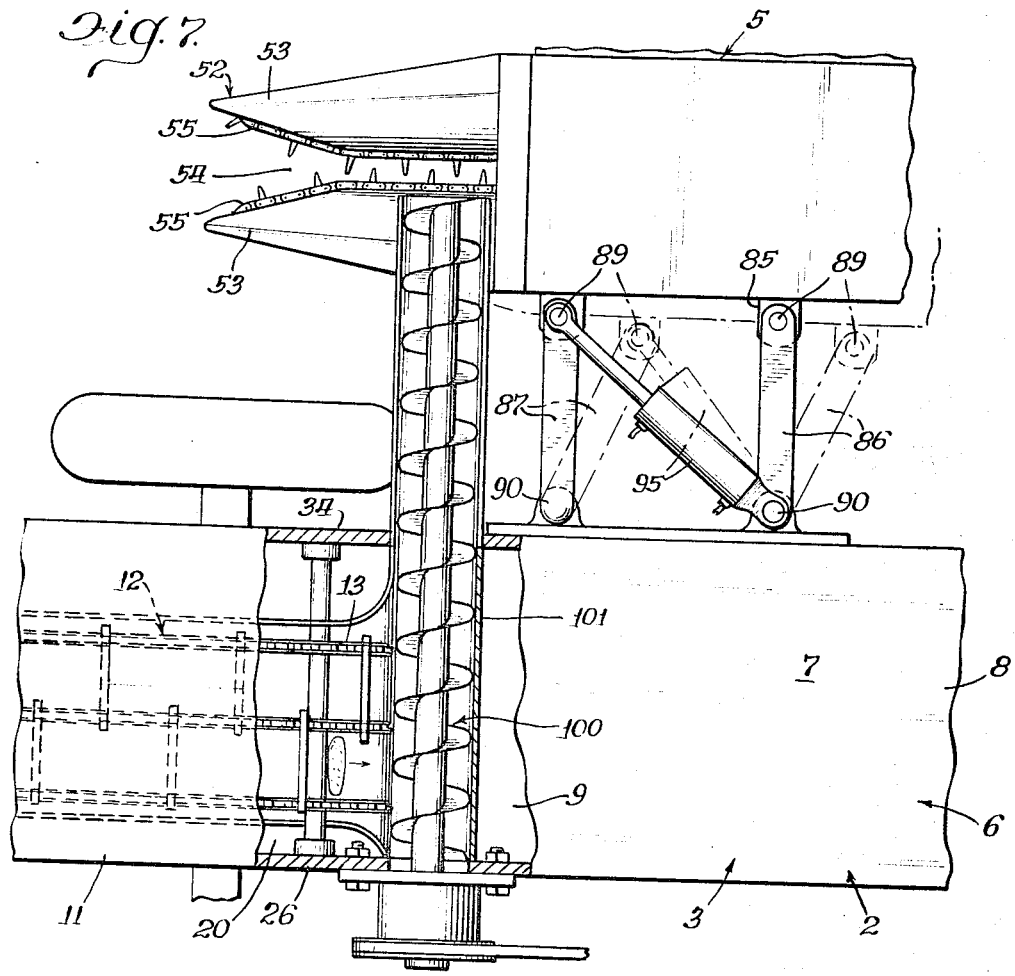
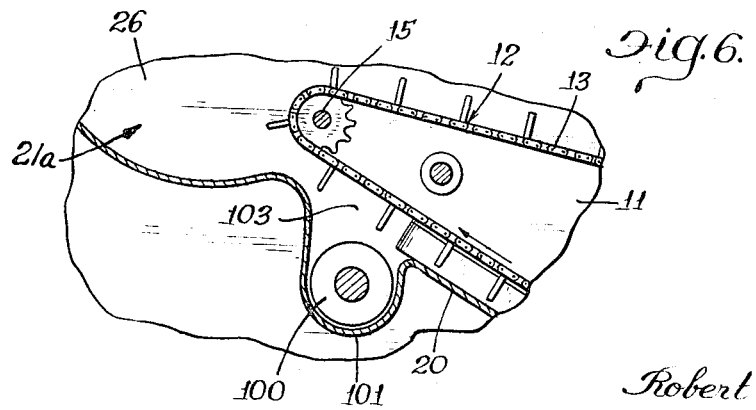
INVENTOR.
Robert E. Medd
BY
John J. Kowalik
Atty.

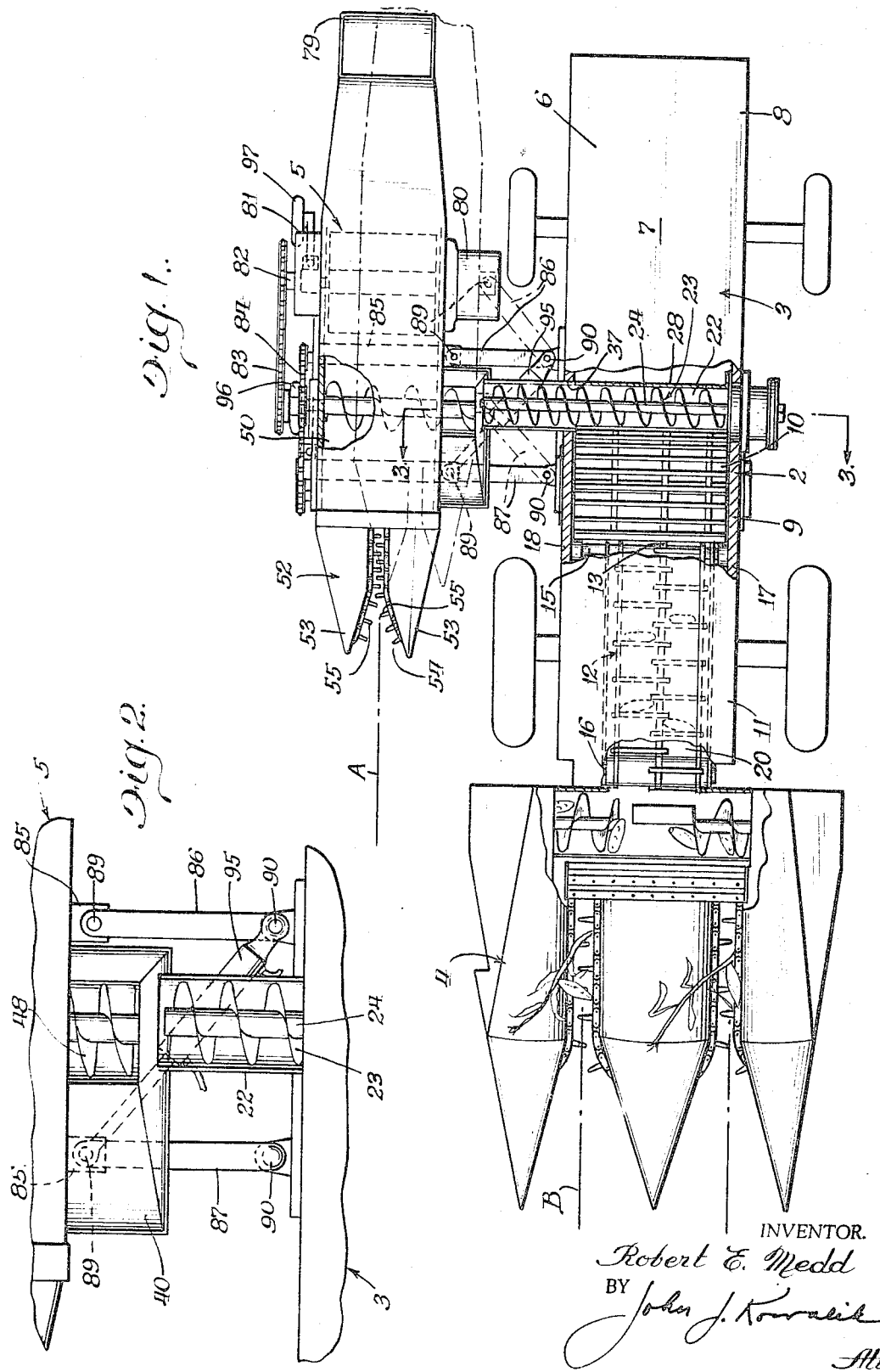

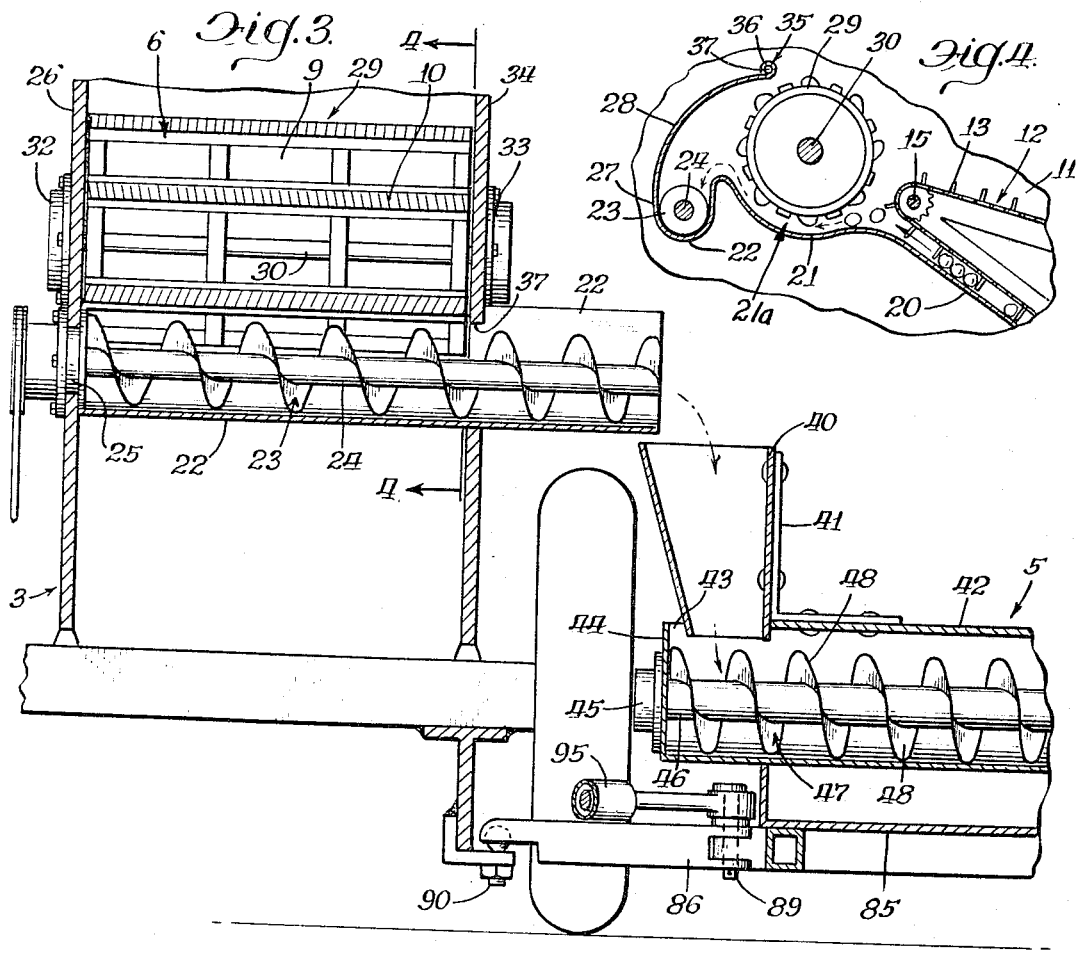
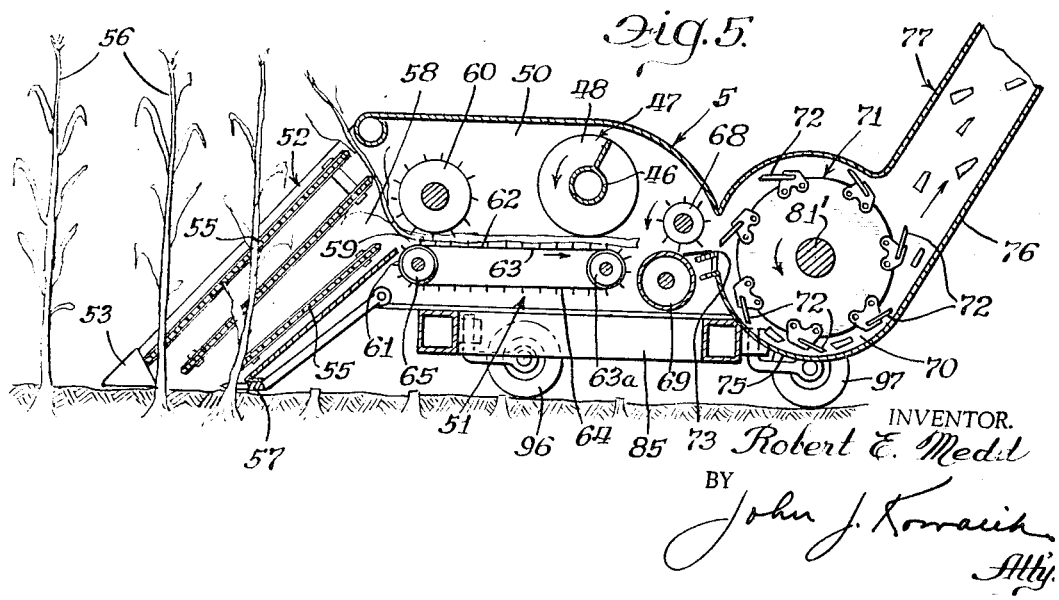

United States Patent Office 3,335,553
Patented Aug. 15, 1967

3,335,553
FORAGE AND COMBINE HARVESTER
Robert E. Medd, Hollandale, Minn. 56045
Continuation of application Ser. No. 350,869, Mar. 10, 1964. This application July 11, 1966, Ser. No. 565,352
11 Claims. (Cl. 56—16)

ABSTRACT OF THE DISCLOSURE

A harvester having a combine harvester with cornhead attachment and a forage harvester attached to the combine harvester and conveying structure extending from the combine harvester adjacent to the cylinder section thereof and delivering corn from the combine harvester to the forage harvester for processing thereby with plants harvested by forage harvester.

This invention relates to crop harvesting machines and more specifically to a novel, high-energy crop harvester. This application is a continuation of my application Ser. No. 350,869, filed Mar. 10, 1964 now abandoned.

Heretofore, attempts have been made to provide a harvester for harvesting forage crops, as for example, the entire corn plant including the stalk, in one row and for picking corn in another row and mixing the forage crop with the corn in order to produce a higher energy-yield silage. This type of equipment is extremely specialized and is useful primarily in the combination for which it is intended.

The general object of the invention is to provide a novel machine which comprises a pair of separable components, one of the components comprising a basic combine harvesting machine with a cornhead attachment and the other component comprising a forage harvester which is mounted to the combine and wherein means are provided for transferring the material from the combine to the forage harvester whereby the forage harvester is adapted to chop and mix the crop material in predetermined desired proportions.

A more specific object of the invention is to provide a novel harvesting machine in which there is provided, in a combine, means for bypassing the threshing cylinder and/or the shaker and the processing components and wherein the material is carried from the machine to an associated forage harvester.

A still further object of the invention is to provide a novel harvesting machine which comprises a plurality of cornheads mounted on the front end of a combine for picking corn from one or more of several rows of corn and wherein the corn is carried by conveying means from the combine to an associated forage harvester which is adapted to operate on an adjacent row.

These and other objects and advantages inherent in and encompassed by the invention will become more readily apparent from the specification and the drawings wherein:

FIGURE 1 is a plan view with parts broken away and shown partly in horizontal section of the novel harvesting machine;

FIGURE 2 is an enlarged fragmentary plan view of the transition conveying means and the hitch or coupling mechanism mounting the forage harvester component and the corn harvesting components to each other;

FIGURE 3 is a sectional view taken substantially on the line 3—3 of FIGURE 1;

FIGURE 4 is a further sectional view taken substantially on the line 4—4 of FIGURE 3; and FIGURE 5 is a longitudinal sectional view of the forage harvester;

FIGURE 6 is a sectional view, corresponding to FIGURE 4, of an alternate arrangement; and FIGURE 7 is a fragmentary plan view of the structure shown in FIGURE 6.

Describing the invention in detail and having particular reference to FIGURES 1-5 of the drawings there is shown a novel harvester generally designated 2 (FIG. 1) which comprises a combine component 3 (such as for example the Nos. 151 and 181 International Harvester Company McCormick combines), with a cornhead attachment 4 (such as for example the International Harvester Company Nos. 40 and 41—4-row corn heads), and a forage harvesting component 5. The combine component 3 is a conventional design which includes a self-propelled wheel-supported processing portion 6 including the housing 7 which comprises a rear portion 8 within which are contained the usual shaker elements (not shown), an intermediate portion 9 wherein there is housed the threshing cylinder 10 and a forward portion 11 within which there is housed an undershot conveyor 12 including a slotted chain 13 which is carried from upper and lower rollers or sprocketed shafts 15 and 16 located between the side walls 17 and 18 of the forward portion of the chamber 11. The corn is carried on a lower upwardly inclined wall 20 of the housing portion 11 into a cylinder section 21a including the concave 21 which, in the present instance, is a solid sheet of material, said concave merging into a trough 22 rearwardly of the concave. The trough encloses an auger 23 which has a core 24 journalled at one end in a bearing structure 25 from one of the vertical side walls 26 of the intermediate portion 9 of the combine. The trough portion 22 has a rear wall 27 which has a concave upper extension 28 is convexed rearwardly from the cylinder 29 and serves as a deflector for corn which is being discharged by the cylinder 29 which cooperates with the concave 21 in crushing and breaking up the cobs, etc. The cylinder 29 has a center shaft 30 which is suitably journalled from bearing structures 32, 33 from the side walls, 26, 34 of the portion 9 of the combine. The upper edge portion 35 of the shield or guide 29 may be provided with a suitable bead 36 which may be carried on the rod or support or bar 37 suitably anchored to side walls 26, 34 of the portion 9 of the combine component. The corn in its shredded form which includes the cobs, etc., is fed by the conveyor 23 laterally or transversely of the component 3 through an opening 37 in the side wall 34. The trough 22 extends over and discharges into a chute 40 which is suitably mounted on a bracket 41 secured to an auger housing 42.

The auger housing 42 is provided with an inlet opening 43 at one end in its upper side, said one end being closed as by a vertical wall 44 which carries a bearing structure 45 mounting the auger core 46 of the auger 47. Auger 47 has a flight 48 which is spiraled in the appropriate direction in relation to its rotation in order to advance the shredded ears of corn into the chamber structure 50 of the forage harvester component 5.

The forage harvester component 5 includes the conveying or receiving chamber 50 within which is housed conveying means generally designated 51.

At the front of the chamber structure 50 there is provided a picker head 52 of conventional design such as currently sold by the International Harvester Company under the designation No. 16 forage harvester or No. 50 forage harvester. The picker head comprises conventional dividers 53 which define the plant passageway 54 therebetween. The passageway 54 is flanked by fingered conveyor chains 55 mounted upon the respective dividers 53 and operative to advance the stalks of crop material rearwardly into the intake 58 after the stalks shown at 56 are cut off as by the sickle 57 (FIG. 5) and delivered to the intake 58 within a bite 59 provided therein which is formed by an upper gathering roller 60 and the forward wrap 61 of the lower conveyor apron 62. Of course, it will be understood that in lieu of this conveying arrangement 51 as herein shown any other conveying arrangement will suffice and that the present invention is not restricted specifically thereto and is only shown in connection therewith merely by way of illustration. It will be seen that the top run 63 of the conveyor chain 62 advances rearwardly and progresses over the rear roller 63a and then the lower run 64 of this chain proceeds forwardly and wraps around the front roller 65. The transition auger or conveyor 47 is herein disclosed as being entered into the chamber 50 behind the gathering roller 60 over the top run 63 of the conveyor apron 62 in front of the upper and lower feed rolls 68 and 69 which receive from the apron 62 and the conveyor 47 and discharges the material into the cutter head 70.

The cutter head 70 has the chopper 71 provided with peripheral blades 72 which cut against the shear bar 73 and propel the material in an undershot slinging action over the lower arcuate portion 75 of the chopper housing, the portion 75 merging with and upwardly, rearwardly tangentially extending bottom wall 76 of the chute structure 77 which terminates the appropriate discharge at its upper end 79 with appropriate deflector controls, etc., as well known to those skilled in the art, for delivering material into a trailing wagon.

The instant structure 5 discloses an engine 80 which is connected to the center shaft 81' of the chopper head 71. Shaft 81' drives a gear reduction 81 which, through an output shaft 82, and the various chain and sprocket drives 83 and 84 drive the various other components of the forage harvester as will be readily apparent. It will be seen that the forage harvester is provided with a suitable underframe structure 85 which is connected by means of the laterally spaced links 86 and 87 to a framework on the side of the combine as at 89, 90. The spacing between the components 3 and 4 is adjustable for various row widths as shown at A and B in FIGURE 1. This is accomplished by means of the two-way hydraulic cylinder 95 which is connected diagonally between the points 89, 90.

The framework may be wheel-supported as by wheels 96 and 97 which may have caster connections with the framework in order to accommodate the in-and-out movement of the unit 5 relative to the unit 3.

Referring now to the embodiments shown in FIGURES 6 and 7 it will be noted that same parts are identified with corresponding reference numerals and that in this embodiment the auger shown at 100 is disposed within a trough 101 and is located before the delivery end 103 of the conveyor 12. Thus the ears of corn are delivered directly to the trough 101 without entry into the combine cylinder section. The trough is suitably supported between the side walls 26 and 34 as in the previous embodiment. In this embodiment the ears of corn are not processed by the cylinder and thus the basic combine structure remains as disclosed and sold by the International Harvester Company as the Nos. 151 and 181 combines. The only modification resides in providing a suitable drive to the auger 100 which may be from any of the drive pulleys of the component. The auger 23 is also driven from any suitable driving pulley source.

Having disclosed the preferred embodiments of the invention, it will be realized that other various forms of the invention will become very readily apparent to those skilled in the art within the scope of the appended claims.

What is claimed is:

1. A high energy crop harvester for gathering the entire plant from at least one row of corn and only the ears of corn from one or more adjacent rows of corn comprising a combine component having a cornhead attachment including conveying means for moving ears of corn removed from plant rows from the cornhead attachment, a conveyor system mounted on the combine and delivering transversely of the combine to a side thereof, a forage harvester component alongside the combine, means for connecting the same together into a unitary mechanism, said forage harvester having a plant passage alignable with a row of corn adjacent to said rows of corn and having means for severing the entire corn plant stalk and all from the ground, a chopper for receiving the entire plant and means for moving the plant to the chopper, said conveyor system having a delivery end into said chopper and said conveying means comprising a conveyor extending rearwardly from the cornhead attachment as respects to the direction of travel of the harvester, and threshing cylinder means behind the conveyor, and said conveyor system comprising a baffle behind the cylinder means in deflecting relation to crop material directed thereagainst by the cylinder means, and a conveyor between the baffle and the cylinder extending outwardly from said side of the combine, said conveyor being imperforate and extending transversely of the direction of travel of the combine component.

2. A high energy crop harvester for gathering the entire plant from at least one row of corn and only the ears of corn from one or more adjacent rows of corn comprising a combine component having a cornhead attachment including conveying means for moving ears of corn removed from plant rows from the cornhead attachment, a conveyor system mounted on the combine and delivering transversely of the combine to a side thereof, a forage harvester component alongside the combine, means for connecting the same together into a unitary mechanism, said forage harvester having a plant passage alignable with a row of corn adjacent to said rows of corn and having means for severing the entire corn plant stalk and all from the ground, a chopper for receiving the entire plant and means for moving the plant to the chopper, said conveyor system having a delivery end into the said chopper and said conveyor system comprising an auger underposed with respect to said conveying means in receiving relation thereto and having an imperforate auger trough and extending transversely of said conveying means.

3. A harvester comprising a combine harvester having a front end, an upwardly and rearwardly delivering elevator conveyor extending from said front end, an attachment mounted to said front end of the combine harvester and including a cornhead for removing ears of corn from the stalks of field growing plants, a forage harvester detachably mounted to said combine harvester and having means for processing corn stalks, said combine having a cylinder at the delivery end of said conveyor for crushing and breaking ears of corn delivered thereto and means for delivering such corn to said forage harvester for processing thereby.

4. The invention according to claim 3 and conveyor means extending from said cylinder to said forage harvester for delivering such corn thereto, said forage harvester having means for mixing the forage with the such corn and delivering the same to an associated receptacle.

5. The invention according to claim 4 and said forage harvester having processing means, and said cornhead attachment being disposed ahead of said processing means.

6. The invention according to claim 5 and said cornhead having means for picking corn from more than one row of corn plants.

7. The invention according to claim 5 and at least said processing means being offset laterally with respect to said cornhead.

8. The invention according to claim 7 and said processing means including a chopper and a delivery spout disposed alongside said combine for delivery to an associated receptacle.

9. A harvester comprising a combine harvester having a front end, an elevator conveyor extending upwardly and rearwardly from said front end, an attachment mounted to said front end of the combine harvester for removing ears of corn from the stalks of field growing plants and delivering them to said elevator conveyor, a forage harvester detachably mounted to said combine harvester and having means for harvesting and processing corn stalks, said conveyor having an upper delivery end, said combine harvester having a cylinder section adjacent to said delivery end of said elevator conveyor, and means adjacent to said cylinder section for receiving the corn and delivering it to the forage harvester for processing thereby together with the stalks harvested by said forage harvester.

10. The invention according to claim 9 and said last-mentioned means disposed for bypassing said cylinder and including a conveyor mounted in receiving relation to said conveyor means for conveying whole ears of corn to said forage harvesters.

11. The invention according to claim 10 and said last-mentioned means comprising a conveyor disposed beneath said conveyor means.

References Cited
UNITED STATES PATENTS

| | | | |
|---|---|---|---|
| 2,264,565 | 12/1941 | Coultas et al. | 56—106 |
| 2,830,704 | 4/1953 | Sammarco | 56—18 X |
| 2,979,877 | 4/1961 | Scranton | 56—18 |
| 3,000,164 | 9/1961 | Kiecker | 56—16 |
| 3,127,723 | 4/1964 | Procter et al. | 56—16 |

ABRAHAM G. STONE, *Primary Examiner.*

ANTONIO F. GUIDA, *Examiner.*